(12) United States Patent
Demir et al.

(10) Patent No.: US 6,907,971 B2
(45) Date of Patent: Jun. 21, 2005

(54) ONE-WAY CLUTCH

(75) Inventors: Semih Demir, London (CA); Norman Scott, St. Thomas (CA)

(73) Assignee: Stackpole Limited, Mississauga (CA)

( * ) Notice: Subject to any disclaimer, the term of this patent is extended or adjusted under 35 U.S.C. 154(b) by 0 days.

(21) Appl. No.: 10/330,143

(22) Filed: Dec. 30, 2002

(65) Prior Publication Data

US 2003/0155204 A1 Aug. 21, 2003

Related U.S. Application Data

(60) Provisional application No. 60/342,860, filed on Dec. 28, 2001.

(51) Int. Cl.$^7$ .................. F16D 11/14; F16D 25/061; F16D 41/18; F16D 43/20
(52) U.S. Cl. .................. 192/46; 192/54.5; 192/69.81; 192/85 A
(58) Field of Search .................. 192/46, 69.81, 192/108, 85 A, 114 T, 54.5

(56) References Cited

U.S. PATENT DOCUMENTS

| | | | |
|---|---|---|---|
| 2,130,671 A | * 9/1938 | Maynes | 242/256 |
| 2,217,453 A | * 10/1940 | Pennell | 192/108 |
| 3,089,344 A | * 5/1963 | Lafitte | 192/108 |
| 3,306,409 A | 2/1967 | Giometti | |
| 3,433,337 A | * 3/1969 | Salter | 192/46 |
| 3,865,220 A | * 2/1975 | Thompson, Jr. | 192/46 |
| 4,155,228 A | * 5/1979 | Burgener et al. | 192/46 |
| 4,261,452 A | * 4/1981 | Barrows | 192/46 |
| 5,050,441 A | * 9/1991 | Giometti | 74/7 C |
| 5,449,057 A | 9/1995 | Frank | |
| 5,678,668 A | 10/1997 | Sink | |
| 5,690,202 A | 11/1997 | Myers | |
| 5,769,197 A | * 6/1998 | Kest et al. | 192/46 |
| 5,871,071 A | 2/1999 | Sink | |
| 6,065,576 A | 5/2000 | Shaw et al. | |
| 6,148,979 A | 11/2000 | Roach et al. | |
| 6,193,038 B1 | 2/2001 | Scott et al. | |
| 6,332,520 B1 | 12/2001 | Costin | |

FOREIGN PATENT DOCUMENTS

| | | |
|---|---|---|
| DE | 1264863 | 3/1968 |
| GB | 1215414 | 12/1970 |
| GB | 2175357 A | 11/1986 |
| SE | 385614 | 7/1976 |

* cited by examiner

Primary Examiner—Rodney H. Bonck
(74) Attorney, Agent, or Firm—John R. S. Orange; Santosh K. Chari; Sean X. Zhang

(57) ABSTRACT

A one-way clutch assembly comprises a clutch casing including a first plate coupled to a second plate, such as clutch inner and clutch outer plates. The first and second plates have a common central axis, the first and second plates are spaced apart along the common axis to define an interior. The assembly also includes a ratchet plate disposed in the interior between the first and second plates, the ratchet plate has the same common axis and is displaceable along the axis within the interior. A first torque transfer mechanism, such as a set of mating splines is used to rotationally couple the ratchet plate to the first plate. A second one-way torque transfer mechanism is used for releasably coupling the ratchet plate to the second plate, the second transfer mechanism including a set of fixed flat and angled portions formed on a ratchet plate surface opposite the second plate and a complimentary set of fixed flat and angled portions formed on a second plate surface opposite the ratchet surface. The assembly also has a biasing mechanism for monitoring the relative axial displacement between the ratchet plate with respect to the second plate, the biasing mechanism for providing an axial force for engaging the ratchet surface with the second plate surface. Accordingly, engagement of the complimentary flat and angled portions effects the one-way torque transfer between the ratchet plate and the second plate. The biasing mechanism can include mechanical and hydraulic actuation.

16 Claims, 5 Drawing Sheets

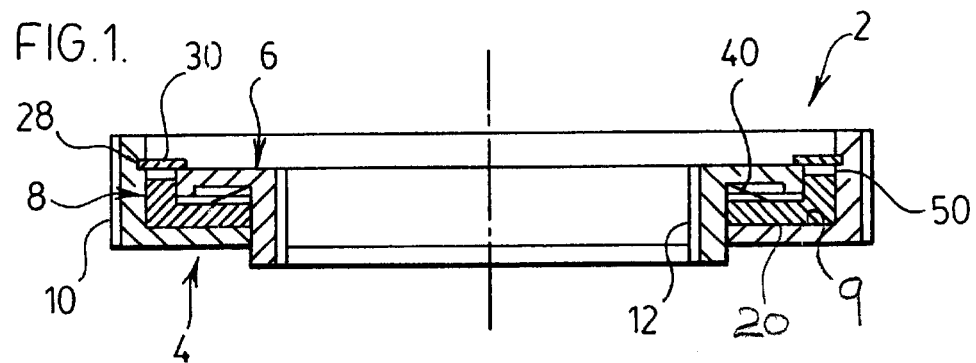
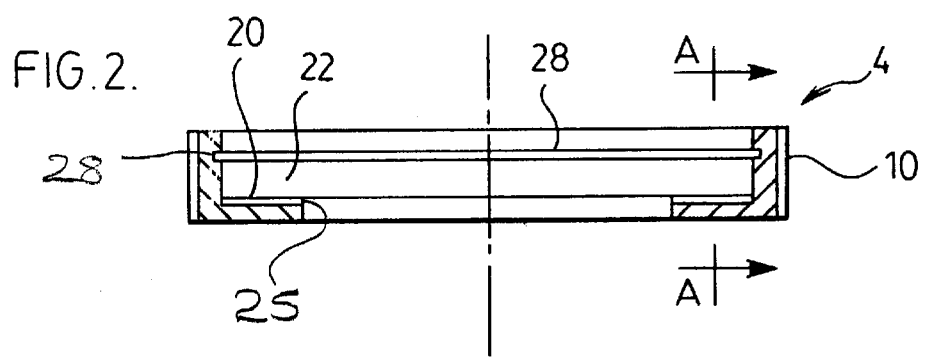
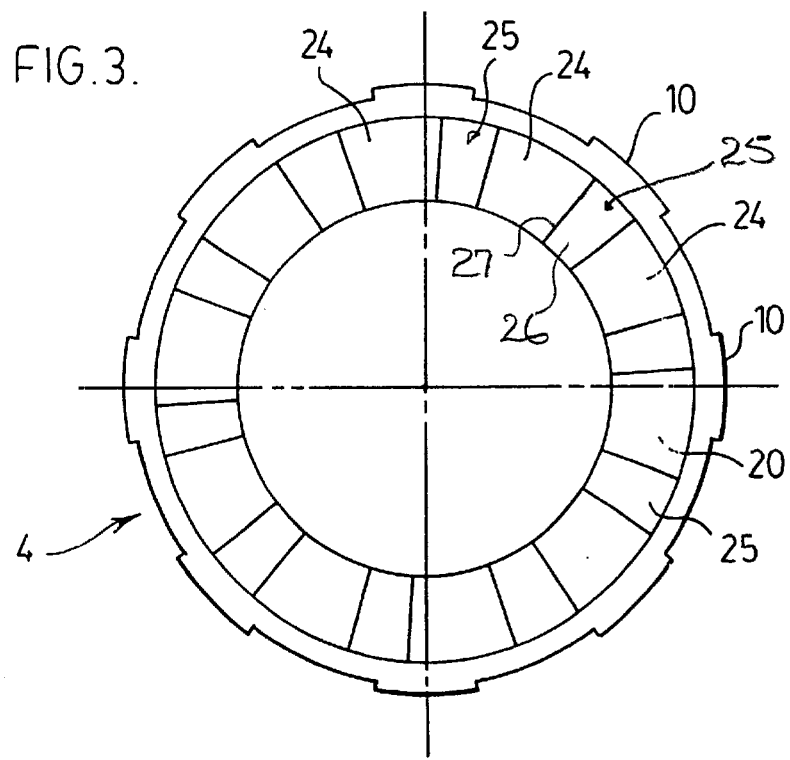

US 6,907,971 B2

ONE-WAY CLUTCH

Priority Claim of U.S. Provisional Application 60/342,860, filed on Dec. 28, 2001.

FIELD OF THE INVENTION

This invention relates generally to a one-way clutch and particularly relates to an assembly within an automatic transmission which enables torque transfer in one direction of rotation only.

DESCRIPTION OF THE PRIOR ART

Various devices have heretofore been designed and manufactured in the nature of a clutch. A clutch generally speaking is a mechanical device which as for example in an automobile is used for engaging and disengaging the motor or engine. A one-way clutch is one type of clutch providing a mechanical component within for example an automatic transmission that enables the torque transfer in one direction of rotation only.

Prior art one way clutches have utilized rollers to transfer torque by radially displacing the rollers and causing lock up in one direction. This results in high bursting forces necessitating massive component parts to be built to withstand the large forces generated. Accordingly such prior art one-way clutches are generally thick and heavy and expensive to manufacture. Moreover such prior art one-way clutch components are typically machined, which can be relatively expensive in manufacture.

Other prior art one-way clutches have utilized independent lugs with springs associated with such lugs that are adapted to engage pockets within a plate utilised in the one-way clutch. The lugs are positioned in cavities and biased into engagement with the pockets. One disadvantage with the lug design is that precision manufacture and assembly is required between the cooperating lugs, pockets, and cavities. Operation of the one-way clutch requires close tolerances between the exterior dimensions of the lugs and the cavity walls, which can be difficult to control during assembly and/or maintain in the lug operating environment. A further disadvantage is that the lugs operate independently of one another, in and out of engagement with their respective pockets. This can result in unbalanced loading of the clutch during engagement and subsequent torque transfer.

It is an object of the present invention to provide a one-way clutch that obviates or mitigates at least some of the above-presented disadvantages.

SUMMARY OF THE INVENTION

According to the present invention there is provided a one-way clutch assembly comprising: a clutch casing including a first plate coupled to a second plate, the first and second plates having a common central axis, the first and second plates spaced apart along the common axis to define an interior; a ratchet plate disposed in the interior between the first and second plates, the ratchet plate having the same common axis and displaceable along the axis within the interior; a first torque transfer mechanism for rotationally coupling the ratchet plate to the first plate; a second one-way torque transfer mechanism for releasably coupling the ratchet plate to the second plate, the second transfer mechanism including a set of fixed flat and angled portions formed on a ratchet plate surface opposite the second plate and a complimentary set of fixed flat and angled portions formed on a second plate surface opposite the ratchet surface, and a biasing mechanism for monitoring the relative axial displacement between the ratchet plate with respect to the second plate, the biasing mechanism for providing an axial force for engaging the ratchet surface with the second plate surface; such that the engagement of the complimentary flat and angled portions effects the one-way torque transfer between the ratchet plate and the second plate.

BRIEF DESCRIPTION OF THE DRAWINGS

These and other features of the preferred embodiments of the invention will become more apparent in the following detailed description in which reference is made to the appended drawings by way of example only, wherein:

FIG. 1 is a fill cross-sectional view of a one-way clutch assembly;

FIG. 2 is a full cross-sectional view of a one-way clutch outer component used in the clutch of FIG. 1;

FIG. 3 is a top plan view of FIG. 2;

FIG. 13b is a further embodiment cross section similar to FIG. 13a.

DESCRIPTION OF THE PREFERRED EMBODIMENTS

Figure 4:
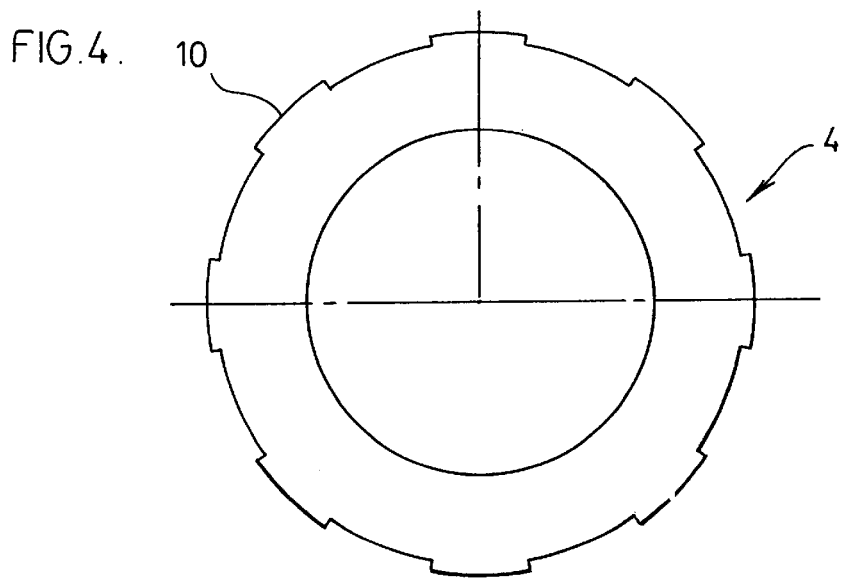
FIG. 4 is a bottom view of FIG. 2.

In the description that follows, like parts are marked throughout the specification and the drawings with the same respective reference numerals. The drawings are not necessarily to scale and in some instances proportions may have been exaggerated in order to more clearly depict certain features of the invention.

Figure 5:
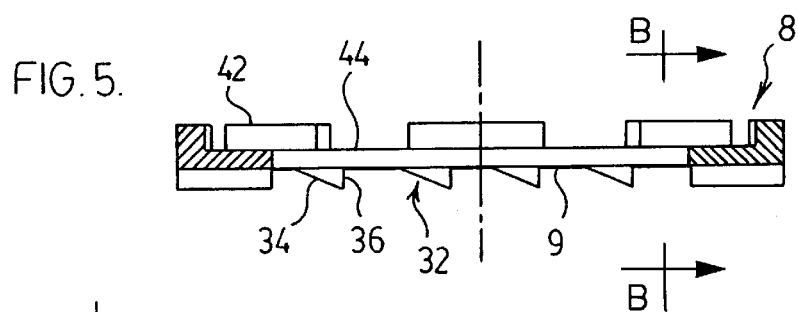
FIG. 5 is a full cross-sectional view of a one-way clutch ratchet as used in the clutch of FIG. 1.
Figure 6:
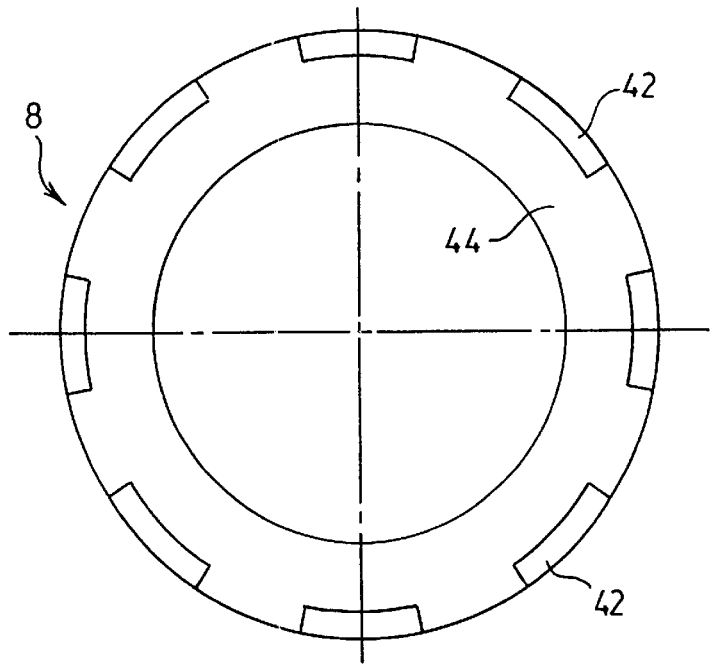
FIG. 6 is a top plan view of FIG. 5.
Figure 7:
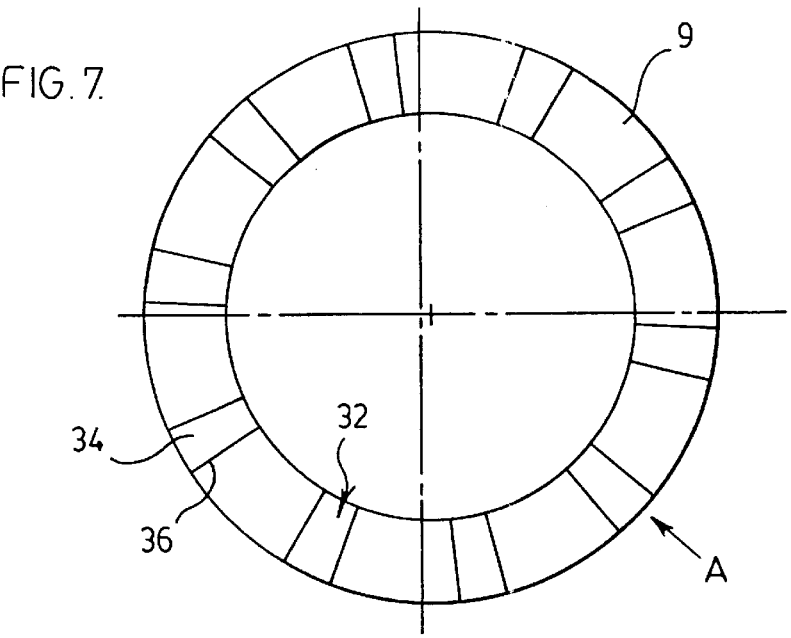
FIG. 7 is a bottom plan view of FIG. 5.
Figure 8:
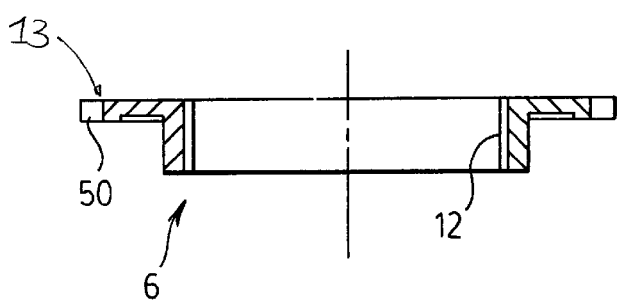
FIG. 8 is a full cross-sectional view of a one-way clutch inner as used in the clutch of FIG. 1.
Figure 9:
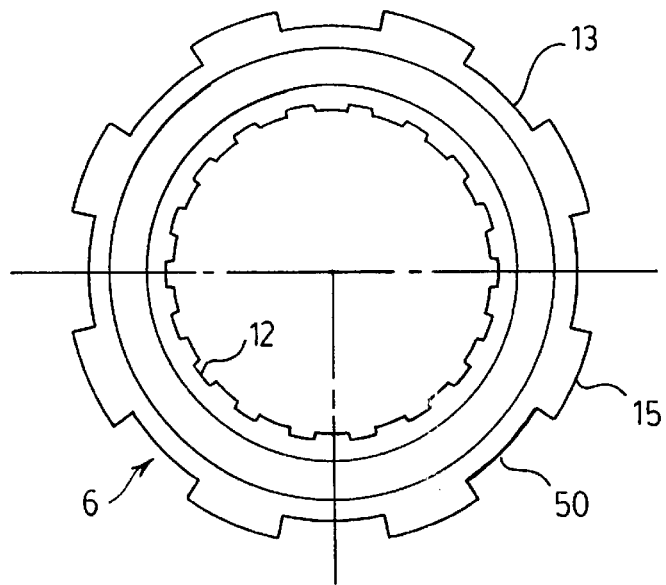
FIG. 9 is a bottom plan view of FIG. 8.
Figure 10:
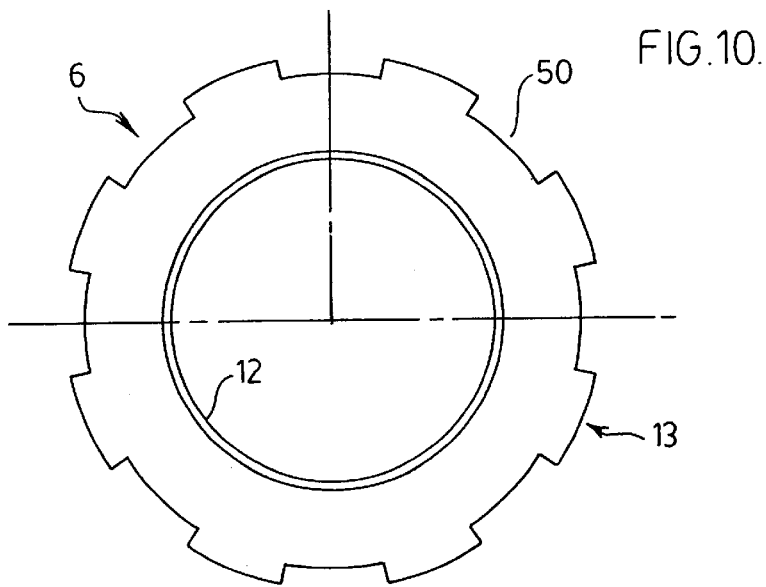
FIG. 10 is a top plan view of FIG. 8.

FIG. 1 illustrates a one-way clutch assembly 2 which comprises of a one-way clutch outer 4 as shown in FIGS. 2, 3, and 4, a one-way clutch inner 6 generally illustrated in FIGS. 8, 9, and 10 and a one-way clutch ratchet 8 shown in FIGS. 5, 6 and 7. The clutch outer 4 and clutch inner 6 can also be referred to as the outer plate 4 and the inner plate 6. The clutch outer 4 and clutch inner 6 can be referred to collectively as a clutch casing having a first plate and a second plate. The clutch 2 is interposed between a drive member and a driven member and typically the clutch inner 6 is connected to a drive member and the clutch outer 4 is connected to a driven member.

Connection to the driven member and drive member is provided by external splines 10 on the outer clutch 4 and internal splines 12 on the clutch inner 6. The drive and driven members may be a hub, a splined housing (not shown), a planetary gear carrier and one of the clutch systems in a transmission (not shown). Although splines 10, 12 are illustrated in the drawings any alternate torque transfer stricture as known in the art may be utilized.

An interface between the ratchet 8 and the clutch inner 4 acts as a one-way torque transfer mechanism, and is designed to enable lock-up of the ratchet 8 with respect to the outer plate 4 in one direction and slippage in the opposite direction. A snap ring groove 28 is disposed in the clutch outer 4, which cooperates with a snap ring 30 for holding the assembly 2 together, such that the clutch outer 4 and clutch inner 6 are coupled together to resist axial separation thereof once assembled.

As seen in FIGS. 2 to 4 and 12a the interface is disposed in a recess 22 of the clutch outer 4. In particular a radially extending inside face 20 of the outer plate 4 includes a series of alternating flat surfaces 24 and teeth 25. The teeth 25 have an inclined surface 26 and an axial face 27 which provide engagement of the clutch outer 4 with a complementary surface 9 on the clutch ratchet 8 in a manner to be more fully described herein.

The one-way clutch ratchet 8 can be generally in constant contact or engagement with the clutch inner 6, as shown in FIG. 1, and is axially loaded along an axis 11 by a biasing mechanism 40 (such as but not limited to a spring) towards the clutch outer 4. The spring 40 preferably consists of an dished, frusto-conical washer although any other biasing means such as a wavey washer or the like may be utilized.

As can be seen in FIGS. 5 to 7, the ratchet 8 has a plurality of projections 42, which extend axially from one surface 44. The projections 42 are circumferentially spaced apart as illustrated in FIG. 6. The projections 42 engage with the pockets 50 of splines 13 formed on the periphery of the clutch inner 6, as shown in FIG. 9. The projections 42 can be formed with axial or tapered sides to suit specific applications. The projections 42 and/or pockets 50 can have angular mating features to either push into or out of engagement the ratchet 8 with outer 4 as torque is transmitted. The splines 13 and mating projections 42 are used as a torque transfer mechanism between the clutch inner 6 and the ratchet plate 8. The ratchet 8 has a surface 9 that is oppositely directed to the surface 44 and has teeth 32 formed with inclined surface 34 and an axial face 36. The teeth 32 are complementary to the teeth 25 for providing transfer of rotational torque in one direction only with slippage in the other direction. The axial faces 27 on teeth 25 engage with complementary faces 36 on the surface 9 on the one-way clutch ratchet 8 to provide engagement in one direction and inclined faces 26, 34 permit relative slippage in another direction. Teeth 25, 32 can be angled or curved or other shapes so long as there is facilitated rotational engagement in one direction and slippage in the opposite radial rotation. In operation, the spring 40 biases the ratchet 8 toward the outer 4 so that teeth 25 are interengaged with teeth 32. Rotation of the clutch inner 6 in one direction causes the faces 27, 36 to abut and transmit torque through the projections 42 between the inner 6 and outer 4. If the inner 6 reverses direction of rotation or if the outer 8 rotates faster than the inner 6, relative rotation will cause the inclined surfaces 26, 34 to slide over each other and axially displace the ratchet 8. The projections 42 slide in the pockets 50 to permit the axial displacement. The sides of the projections 42 may be profiled to enhance engagement upon application of torque or enhance separation of the teeth, depending in the particular application in which the clutch is used.

Figure 11:
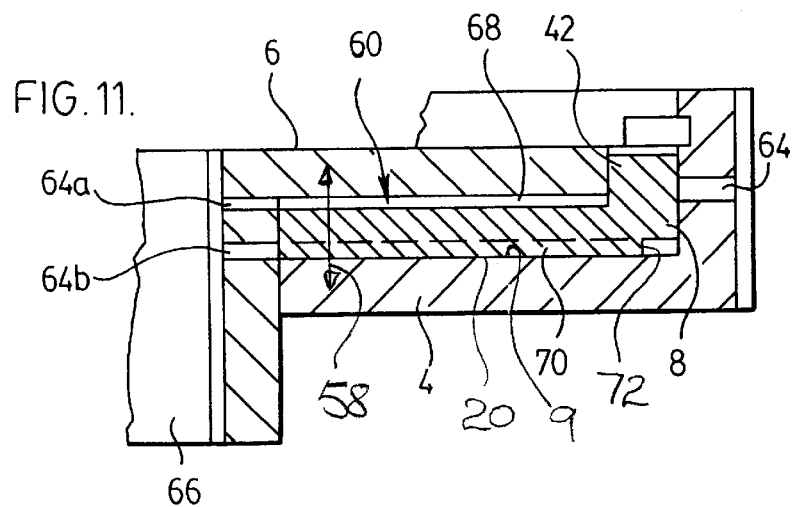
FIG. 11 is a further embodiment of the clutch of FIG. 1.

In an alternative embodiment FIG. 11, operation of the clutch 2 is facilitated by the provision of lubrication cross-holes 64, radially drilled through the splines 12, so that during the free turning mode transmission fluid can be pumped through the outer plate 4. The transmission fluid can provide lubrication and dampening the recovery force of the spring 40. The cross-holes 64 may also be axially drilled adjacent the splines 13 for lubrication purposes.

In a further adaption of the embodiment of FIG. 11, the ratchet 8 is positioned between the outer plate 4 and the inner plate 6. Reciprocal axial displacement (indicated by arrow 58) of the ratchet 8 in a cavity 60 between the inner 6 and outer 4 plates can also be done using selective application of hydraulic fluid as the biasing mechanism 40. The pressurised fluid is communicated through either ports 64a, 64b which transfer the fluid between the cavity 60 and an interior 66 of the inner plate 6. It will be appreciated that the interior 66 typically contains a hollow transmission shaft (not shown), which provides the supply of hydraulic fluid from the transmission (not shown) to the interior 66 and through the ports 64a, 64b into the cavity 60.

Where fluid is used to engage the teeth 25, 32, venting of fluid between the plates may be provided by apertures 72 formed between adjacent teeth. The cavity 60 is separated by the ratchet 8 into an upper cavity 68 and a lower cavity 70. Port 64a is in fluid communication with upper cavity 68 and port 64b is in independent fluid communication with cavity 70. Therefore, surfaces 20 and 9 are biased into engagement when fluid is forced through port 64a into cavity 68 and removed through port 64b from cavity 70. Likewise, surfaces 20 and 9 are encourages to disengage in whole or in part from forcing fluid through port 64b and into cavity 70, where any fluid resident in cavity 68 is allowed to escape. It is recognized that opening and closing of the ports 64a, 64b can monitored by similar electronic/mechanical controls used to signal engagement/disengagement of the clutch assembly 2, as is known in the art. As described above with reference 11, when opened, the port 64b facilitates removal of the fluid located in the cavity 70 between the faces 20, 9. Further, it is recognized that the biasing mechanism 40 can be a combination of the spring and the hydraulic fluid, if desired and where hydraulic fluid is used the spring may be biased to disengage the ratchet plane.

Figure 12A:
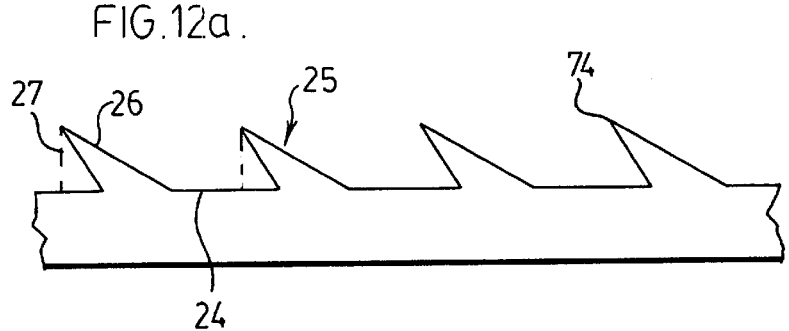
FIG. 12a is a cross-sectional view on the line A—A of the outer plate of FIG. 2.
Figure 12B:
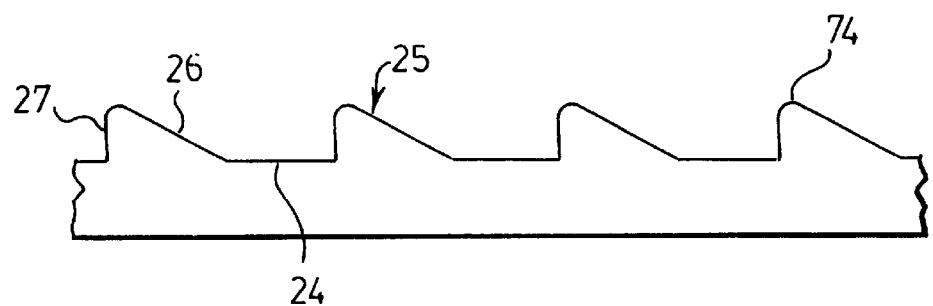
FIG. 12b is a cross section similar to FIG. 12a of a further.

The configuration of the teeth 25 is shown in greater detail in figures 12a and 12b. An intersection 74 between the inclined surface 26 and axial face 27 can be arcuately shaped bevelled, if desired. Further, it is noted that the axial face 27 can be undercut, for example as shown in FIG. 12a, to facilitate engagement between the faces 20, 9 when the teeth 25 of ratchet 8 comes into close axial proximity with the teeth 25 of clutch outer 4. Accordingly, this undercut can also be used as the biasing mechanism 40, either in whole of in part, to help convert the rotational thrust of the clutch assembly 2 to assist the axial displacement of the ratchet 8 with respect to the clutch outer 6. Further, referring to FIG. 12b the intersection 74 may be straight or arcuately shaped (such as but not limited to a helical cut), as projected for example from a centre of the ratchet plate 8. It is recognized that the edge 74 of the surface 20 would be complimentary to that of the surface 9.

Figure 13A:
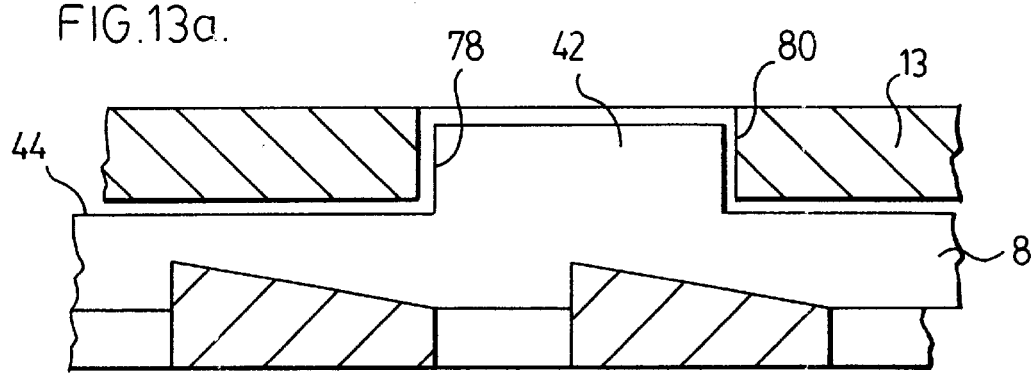
FIG. 13a is a cross-sectional view B—B of the ratchet plate of FIG. 5.

Referring to FIGS. 9 and 13a, the ratchet 8 has a straight-sided or axial face 78 of the projections 42. A complimentary face 80 of the splines 13 is positioned on the clutch inner 4, such that the face 80 is in continuous engagement with the face 78 of the ratchet 8 during operation of the clutch assembly 2.

Figure 13B:
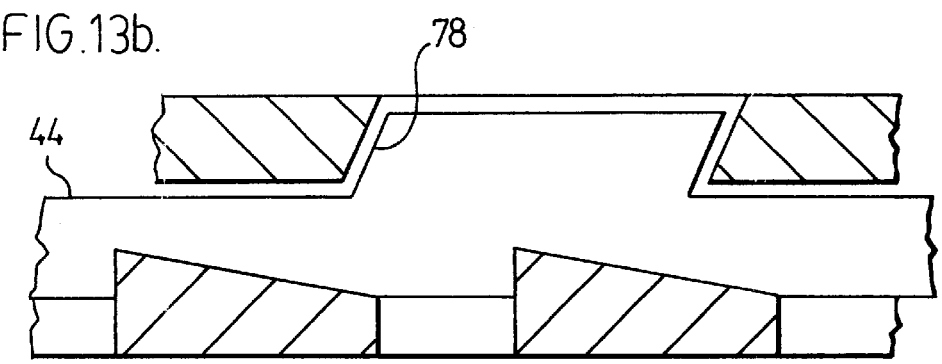

Referring to FIG. 13b, an alternative embodiment of the face 78 is such that it has an angular or helical orientation with respect to the surface 44. This angular orientation can also be used as the biasing mechanism 40, either in whole of in part, to help convert the rotational thrust of the clutch assembly 2 to assist the axial displacement of the ratchet 8 with respect to the clutch outer 6.

Various embodiments of the invention have now been described in detail. Since changes in and/or additions to the above-described best mode may be made without departing from the nature, spirit or scope of the invention, the invention is not to be limited to said details. For example, it is recognised that the interaction of the clutch inner 6 and clutch outer 4 with the ratchet plate 8 could be reversed, such that the interface of faces 20, 9 could be between the clutch inner 6 and a reverse orientation of the ratchet plate 8, with the projections 42 of the ratchet plate 8 interacting with splines 10 situated in the recess 22 of the clutch outer 4. Further, the biasing mechanism 40 can use either the hydraulic actuation and/or the mechanical actuation of such as but not limited to the springs, the angled spline surfaces 78, and the angled shoulders 27.

Preferably the inner 6, outer 4 and ratchet 8 are formed by powder metallurgy techniques as is known in the art.

The embodiments of the invention in which an exclusive property or privilege is claimed are defined as follows:

1. A one way clutch assembly comprising:
    a) a clutch casing including a first plate having a central hub and a radial flange extending outwardly therefrom, a second plate, having a radial wall extending about said hub and terminating at a peripheral wall extending axially beyond said radial flange, the first and second plates having a common central axis and said radial wall and radial flange being spaced apart along the common axis to define an interior;
    b) a ratchet plate disposed in said interior between the first and second plates, the ratchet plate having the same common axis and displaceable along the axis within the interior;
    c) a first torque transfer mechanism acting between circumferental edges of said radial flange and said ratchet plate for rotationally coupling the ratchet plate to the first plate whilst permitting axial sliding motion therebetween;
    d) a second torque transfer mechanism for releasably coupling the ratchet plate to the second plate, the second transfer mechanism including a set of teeth formed on a radial extending ratchet plate surface opposite the radial wall of said second plate and a complimentary set of teeth formed on a second plate surface of said radial wall opposite the ratchet surface each set of teeth including an axially extending face and an inclined surface; and
    e) a biasing mechanism permitting relative axial displacement between the ratchet plate with respect to the second plate, the biasing mechanism providing an axial force for engaging the ratchet surface with the second plate surface;

such that the engagement of the complimentary teeth effects the one-way torque transfer between the ratchet plate and the second plate.

2. The clutch assembly according to claim 1, wherein said first torque transfer mechanism includes axially extending faces substantially perpendicular to said plate surfaces.

3. The clutch assembly according to claim 1, wherein said torque transfer mechanism includes axially extending faces inclined with respect to said surfaces to encourage engagement of said second torque transfer mechanism.

4. The clutch assembly according to claim 1, wherein the biasing mechanism is a spring positioned between the first plate and the ratchet plate.

5. The clutch assembly according to claim 1, wherein the biasing mechanism includes fluid entry ports for admitting hydraulic fluid into the interior.

6. The clutch assembly of claim 5 wherein said entry ports for selectively supplying the hydraulic fluid to either side of the ratchet plate.

7. The clutch assembly according to claim 5 further comprising an exit port in the second plate for removing hydraulic fluid pressure between the ratchet surface and the opposing second plate surface.

8. The clutch assembly according to claim 7, wherein said exit port is located between adjacent teeth.

9. The clutch assembly according to claim 1, wherein the biasing mechanism includes a series of complimentary angular oriented splines between the first plate and the ratchet plate, said splines being oriented to convert torque applied to said clutch assembly to axial thrust of the ratchet plate.

10. The clutch assembly according to claim 1, wherein the first plate is a clutch inner plate and the second plate is a clutch outer plate.

11. The clutch assembly according to claim 10, wherein the clutch inner plate is a drive member and the clutch outer plate is a driven member.

12. The clutch assembly according to claim 1, wherein the angled portion are arcuately shaped.

13. The clutch assembly according to claim 1, wherein the first torque transfer mechanism is a set of complimentary splines.

14. The clutch assembly according to claim 1, wherein said plates are formed by powder metallurgy.

15. The clutch assembly according to claim 1, wherein the biasing mechanism is selected from the group comprising hydraulic and mechanical.

16. The clutch assembly according to claim 15, wherein the mechanical biasing mechanism is selected from the group comprising angled shoulders, a spring, and mating angled splines.

* * * * *